United States Patent Office 2,949,421
Patented Aug. 16, 1960

2,949,421

PREPARATION AND USE OF ACID ACTIVATED CLAY

Ivor W. Mills, Glenolden, Pa., assignor to Sun Oil Company, Philadelphia, Pa., a corporation of New Jersey No Drawing. Filed Dec. 29, 1955, Ser. No. 556,061

6 Claims. (Cl. 208—299)

This invention relates to the preparation and use of sulfuric-acid activated clay, and more particularly to a manner of improving the products which are obtained by refining petroleum with such clay.

It is well known in the art to improve the properties of various petroleum products by contacting the latter with various natural clays, which have been treated with sulfuric acid in order to make them more effective in removing undesirable constituents from the petroleum materials which are treated. The sulfuric acid activation generally involves the formation of an aqueous slurry of crushed clay, the slurry containing sulfuric acid in suitable concentration as well known in the art, the contacting generally being carried out at an elevated temperature in the general neighborhood of 200° F., and the contacting being carried out for several hours. The acid treated clay is generally washed with water in order to remove excess sulfuric acid, and the washed clay is generally dried or calcined at elevated temperatures in order to adjust the water content of the finished clay.

In spite of the efforts which are commonly made to avoid the presence in the finished clay of materials which would produce undesirable results in the subsequent use of the clay for refining petroleum, it has been found that petroleum products obtained by refining with acid-activated clay may have undesirable properties which applicant has found to be attributable to foreign materials which were present on the clay, and which were transferred to the petroleum products during the refining operation. Thus, it has been found that treated oils may be excessively corrosive to copper, and prior to the present invention the reason for this phenomenon has not been understood. According to the invention, however, this condition has been overcome in a novel manner.

The process of the present invention involves subjecting clay, which has been activated by contact with sulfuric acid, to contact with a liquid solvent as subsequently specified. This contact is performed prior to subjection of the clay to substantial use in the refining of petroleum materials. It has been found that the solvent which has been used to contact an acid treated clay according to the process of the invention, contains substantial amounts of elemental sulfur, which have apparently been removed from the clay during the contacting operation. It is believed that the elemental sulfur is probably formed during the treatment of the clay subsequent to the contacting with sulfuric acid. It may be that, in the drying or calcining operations, carried out in the presence of stack gas for example, the clay is brought into contact with materials having a reducing action on small amounts of sulfuric acid remaining in the clay, and that the sulfuric acid is consequently reduced to elemental sulfur.

The solvents which can be employed according to the invention are selected from the group consisting of hydrocarbons, halogen-substituted hydrocarbons, alcohols, ethers, ketones, carboxylic acids, carboxylic acid esters, and carbon disulfide. The solvent is employed in liquid phase. The solvent employed is preferably substantially free of impurities which would normally be removed from the solvent by the clay treatment; the purpose of the contacting with solvent is primarily to remove sulfur from the clay, rather than to remove impurities from the solvent by means of the contacting with clay. During the contacting with clay, a portion of the solvent used will generally be adsorbed upon the clay, and this adsorbed material can be removed if desired by steaming the clay or other suitable means. Alternatively, the material can be allowed to remain on the clay until displaced therefrom by the petroleum material during the subsequent use of the clay for refining such petroleum material. However, in the case of the more polar solvents, it will generally be desired to remove them prior to the refining operation, since they are displaced from clay by petroleum materials only with difficulty.

The treatment with solvent according to the invention can be performed at ordinary room temperature if desired. However, higher temperatures can be employed, for example up to 300° F. or higher, and the use of elevated temperatures generally provides a more effective removal of elemental sulfur from the clay. Since the contacting is to be performed with the solvent at least primarily in liquid phase, the contacting is performed under elevated pressure if necessary to maintain the liquid phase at the temperature employed.

The invention is applicable to the treatment of petroleum materials generally, wherein the petroleum is contacted in liquid phase with the clay. Examples of suitable types of petroleum materials which can be refined are crude petroleum, wax, lubricating oils, gas oil, kerosene, gasoline, etc. Straight run or cracked fractions can be refined.

Examples of suitable solvents which can be employed according to the invention are benzene, toluene, xylenes, n-pentane, methyl acetate, benzyl benzoate, acetone, dioxane, methyl alcohol, carbon tetrachloride, acetic acid, methyl monoether of ethylene glycol, diphenyl ether, carbon disulfide, cyclohexane, hexenes, naphthalene, benzyl alcohol, diethyl ether, benzophenone, benzoic acid, lauric acid, cyclohexylacetic acid, chlorobenzene, chlorocyclohexane, etc. Preferably the molecular weight of the solvent employed is not substantially above 110. However higher molecular weight solvents can be employed if desired. Mixed solvents can also be employed if desired.

The following examples illustrate the invention:

*Example I*

Bentonite clay was employed to refine a petroleum wax having melting point of about 150° F. by contact with the latter in liquid phase at a temperature of about 250° F. for 1½ hours. The bentonite had been previously activated by sulfuric acid treatment in a conventional manner. Typical conditions for such activation are disclosed by Kirk et al., in "Encylopedia of Chemical Technology," vol. 4, at page 55 (1949). These conditions include the use of acid amounting to 35% of the total dry weight of the clay, treatment with live steam to a temperature of about 200–210° F. for 5–6 hours, washing with water, and filtration. Calcination of the clay at about 600° F. was also involved in the preparation of the clay used in this example.

The wax was contacted first with a mixture of the acid-activated and calcined bentonite with Attapulgus clay which had not previously been acid activated, the acid-activated bentonite constituting 25 percent of the mixture, and the total amount of clay being 30 pounds per barrel of wax. As a result of this treatment, the color of the wax was substantially improved, but the product was found to be corrosive to copper in the copper strip test. This test involved the immersion of a copper strip, polished according to A.S.T.M. standards, in the liquefied wax to be tested, and the maintenance of the wax at 212° F. for various periods of time. The copper strip is observed at the end of the period to determine whether it has undergone substantial staining during the test, and the wax is considered to fail the test if substantial staining has occurred. In the present instance, staining of the copper strip occurred with 2 to 4 hours.

By way of contrast, experiments were performed according to the same procedure, except that the acid-activated and calcined clay was contacted in a Soxhlet extractor with 300 cc. of benzene per 100 grams of clay for 6 hours, prior to the wax refining operation. In these experiments, employing the clay thus contacted with benzene, no staining occurred in the copper strip test of the refined wax during a period of 12 hours. A period of 10 hours or more without staining is a very satisfactory result in this test.

The benzene, which had been used to pretreat the clay, was found to contain substantial amounts of elemental sulfur, thus indicating that elemental sulfur was removed from the clay during the contact with benzene. This example shows that highly improved results can be obtained in the use of acid-activated clay for refining when such elemental sulfur is removed, according to the process of the invention, prior to the refining operation.

*Example II*

Various solvents other than benzene were used to contact acid-activated and calcined clay generally similar to that employed in Example I. 25 to 30 cc. of the solvent were intimately admixed with 10 grams of clay, and contact maintained for about half an hour. The solvent was then separated from the clay, and tested for the presence of elemental sulfur. In every case, the test was positive, indicating that the solvent had removed elemental sulfur from the clay. The solvents employed were n-pentane, methyl acetate, acetone, dioxane, carbon tetrachloride, methyl monoether of ethylene glycol, methyl alcohol and acetic acid. The latter two solvents gave a weak test for elemental sulfur, as contrasted with the strong test provided by the other solvents, thus indicating that methyl alcohol and acetic acid are inferior to the other solvents for the purpose of the invention. Higher molecular weight alcohols and carboxylic acids, for example those having at least 3 carbon atoms, may provide superior results to those obtained with methyl alcohol and acetic acid.

The invention is applicable generally to the types of clay which are adapted for use, after activation with sulfuric acid, in the refining of petroleum materials. In the preceding example, bentonite was employed, but other suitable types of clay are also beneficially treated according to the invention.

The solvent which has been employed to remove elemental sulfur from clay can be subsequently treated if desired in order to recover elemental sulfur therefrom. Any known method for recovery of elemental sulfur from solutions in organic solvents can be employed. Thus, for example, the solvent could be distilled prior to re-use, the sulfur being recoverable as residue in the distillation.

The invention claimed is:

1. In a process for refining petroleum wherein petroleum is contacted in liquid phase with sulfuric-acid activated clay which has been washed with an aqueous material and dried prior to contact with petroleum, and wherein a corrosive product is normally obtained as a result of said contact, the improvement which comprises, prior to said contact, contacting the dried clay at a temperature not substantially above 300° F. with a hydrocarbon solvent in liquid phase, thereby to remove elemental sulfur remaining in the clay after drying, and thereby to permit obtaining a noncorrosive product from the first-named contacting.

2. Process according to claim 1 wherein said petroleum has average molecular weight at least as great as that of lubricating oil, and wherein said solvent has an average molecular weight not substantially greater than 110.

3. Process according to claim 1 wherein sulfur is recovered from the solvent subsequent to the contacting of said dried clay with said hydrocarbon solvent.

4. Process according to claim 1 wherein said clay is dried by calcining at about 600° F.

5. Process according to claim 1 wherein said solvent is an aliphatic hydrocarbon.

6. Process according to claim 1 wherein said solvent is an aromatic hydrocarbon.

References Cited in the file of this patent

UNITED STATES PATENTS

| | | |
|---|---|---|
| 1,579,326 | Kauffman | Apr. 6, 1926 |
| 1,963,818 | Wright | June 19, 1934 |
| 2,326,295 | Gee | Aug. 10, 1943 |
| 2,339,248 | Danforth | Jan. 18, 1944 |
| 2,553,239 | Christiansen | May 15, 1951 |
| 2,556,438 | Parker et al. | June 12, 1951 |
| 2,643,215 | Hoge | June 23, 1953 |
| 2,756,196 | Uzzell et al. | July 24, 1956 |
| 2,793,219 | Barrett et al. | May 21, 1957 |